(12) United States Patent
Leonard et al.

(10) Patent No.: US 6,746,004 B2
(45) Date of Patent: Jun. 8, 2004

(54) VEHICLE AIR SPRING ASSEMBLY

(75) Inventors: Joshua R. Leonard, Noblesville, IN (US); Pradipta N. Moulik, Carmel, IN (US); Stephen C. Street, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/309,385

(22) Filed: Dec. 3, 2002

(65) Prior Publication Data

US 2003/0116898 A1 Jun. 26, 2003

Related U.S. Application Data

(60) Provisional application No. 60/336,806, filed on Dec. 5, 2001.

(51) Int. Cl.[7] .................................................. F16F 9/04
(52) U.S. Cl. ................................. 267/64.27; 267/64.19
(58) Field of Search .......................... 267/64.27, 64.19, 267/64.21, 64.23, 64.24, 64.28, 140

(56) References Cited

U.S. PATENT DOCUMENTS

| | | | |
|---|---|---|---|
| 2,999,681 A | * | 9/1961 | Muller et al. ............ 267/64.27 |
| 3,043,582 A | * | 7/1962 | Hirtreiter ................. 267/64.24 |
| 4,718,650 A | * | 1/1988 | Geno ....................... 267/64.27 |
| 4,787,608 A | | 11/1988 | Elliott |
| 5,201,500 A | | 4/1993 | Ecktman et al. |
| 5,253,850 A | | 10/1993 | Burkley et al. |
| 5,269,496 A | | 12/1993 | Schneider |
| 5,941,510 A | | 8/1999 | Grass et al. |
| 6,345,813 B1 | | 2/2002 | Trowbridge |
| 6,361,028 B1 | * | 3/2002 | Hubbell ................... 267/64.27 |
| 6,386,525 B1 | | 5/2002 | Stuart |
| 6,398,198 B1 | | 6/2002 | Okamoto |

* cited by examiner

Primary Examiner—Jack Lavinder
Assistant Examiner—Melanie Torres
(74) Attorney, Agent, or Firm—Michael Sand; Michael Huber

(57) ABSTRACT

A vehicle air spring assembly has a pair of spaced end plates which sealing engage a bladder to form an air chamber. A pair of bead skirts are attached to the end plates to guide the bladder radially outwardly as the air spring is compressed. By guiding the bladder as it expands radially outwardly, the bead skirts control the effective area with respect to the air spring height, thus controlling the dynamic load and dynamic spring rate of the air spring. The bead skirts are formed complementary in shape and nestle together as they move towards one another. This nestling reduces pinching of the bladder when the air spring is compressed during use.

18 Claims, 5 Drawing Sheets

VEHICLE AIR SPRING ASSEMBLY

CROSS REFERENCE TO RELATED APPLICATION

This application claims priority from U.S. Provisional Application Serial No. 60/336,806 filed Dec. 5, 2001, the disclosure of which is incorporated herein by reference.

BACKGROUND OF THE INVENTION

1. Field of the Invention

The invention relates to a convoluted air spring assembly for vehicle suspensions.

2. Background Information

Convoluted air spring assemblies typically include two end plates or bead plates sealingly connected to respective ends of a hollow fabric reinforced rubber bladder. These air springs are used primarily for implementation in motor vehicles for supporting the vehicle body or for use in other types of equipment subject to shock to provide cushioning therefor. The air springs are sealed at the ends to form a pressurized fluid chamber within the bladder. An air spring will generate a certain load at a given height and pressure. Upon the air spring experiencing a road displacement input, the bladder will begin to collapse or extend as the end members move toward or away from each other, respectively, to yield predictable dynamic load characteristics.

These dynamic load characteristics of the air spring are a function of the internal air pressure, volume and effective area. For a given height, the effective area is determined by dividing the air spring load by the internal pressure. The effective area of a convoluted air spring is typically only controlled by the maximum inflated diameter and length of the fabric reinforced rubber bladder. The effective area varies with the air spring height.

Often it is desirable to tailor the dynamic load characteristics of the convoluted air spring, such as dynamic spring rate and natural frequency, to fit a particular vehicle or application. Typically, this is accomplished by adjusting the internal volume or fluid type within the flexible bladder. When these parameters are established, it is necessary to modify the effective area.

Heretofore, once the bladder is inflated to its maximum air pressure, a larger bladder is required to provide for increased load capabilities of the air spring. However, it is not always practical to change the bladder size for all applications. For example, some vehicles have certain space limitations, which do not allow for a larger bladder size. Additionally, changing the bladder size may affect other characteristics of the air spring.

U.S. Pat. No. 6,345,813 shows an air spring having a pair of support rings with outer surfaces over which the sleeve moves as the air spring changes height to effect the spring rate. Although such a structure may by satisfactory for many applications, it may not be suitable in certain applications where there is articulation or the available height is at a minimum due to the trapping and pinching of the expanded sleeve between the outer surfaces of the pair of opposed support rings.

SUMMARY OF THE INVENTION

What the art needs is an air spring assembly, which allows for control of its effective area in order to achieve certain dynamic load characteristics without having to significantly change the physical size of the bladder.

The invention changes the effective area of the convoluted air spring by using a skirt on each bead plate that controls the shape of the bladder as the air spring travels between its maximum extended height and its minimum collapsed height. It is the change in effective area with respect to the air spring height that changes the dynamic load, thus effecting the dynamic spring rate.

Adding such skirts to both ends of an air spring may cause clearance issues at the fully collapsed height, especially if both skirts protrude toward each other. This invention uses a skirt, typically, but not restricted to, mounting on the upper bead plate that protrudes or tapers down toward the other bead plate. The other skirt, typically, but not restricted to, mounting on the lower bead plate tapers away from the opposite skirts. Such skirts are then complementary having one skirt which forces the inflated bladder over the other skirt until they are nestling close together at the fully collapsed height. This, in essence, translates vertical clearance into horizontal clearance while still substantially persuading the effective area.

BRIEF DESCRIPTION OF THE DRAWINGS

Similar numerals refer to similar parts throughout the drawings.

PREFERRED EMBODIMENTS OF THE INVENTION

Figure 1:
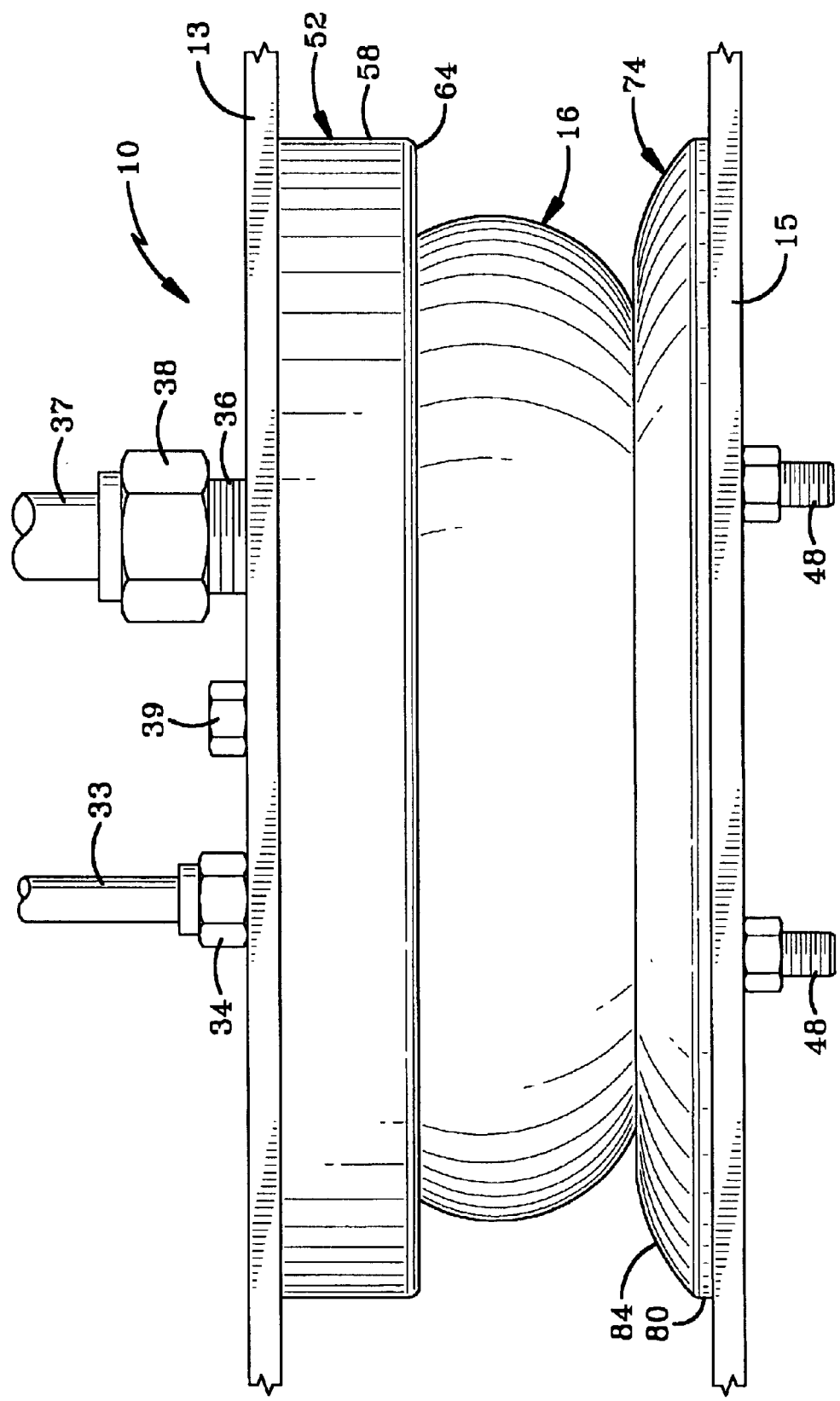
FIG. 1 is a side elevational view of the vehicle air spring assembly of the present invention in an at-rest position.
Figure 2:
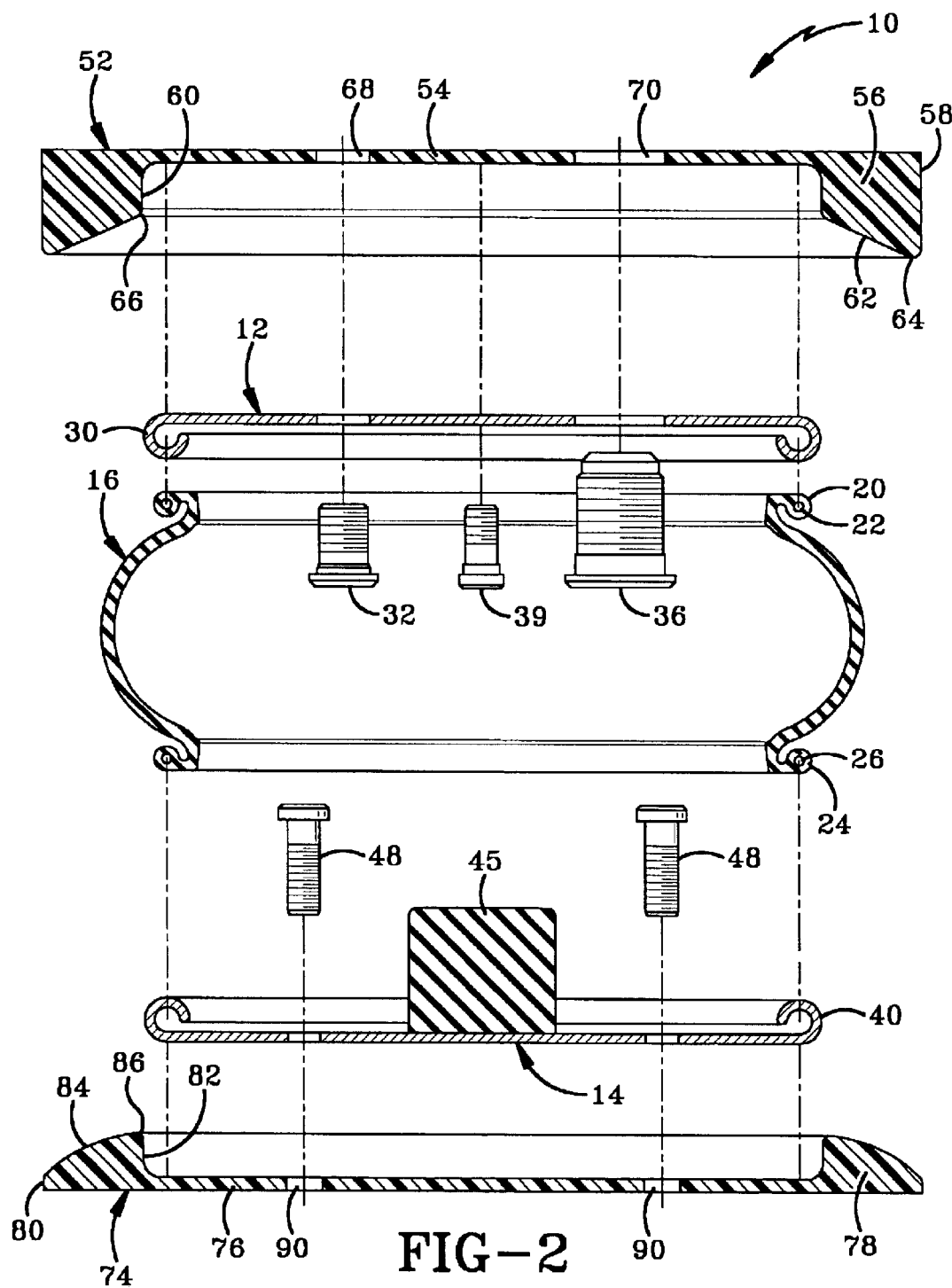
FIG. 2 is an exploded sectional view of the air spring of FIG. 1.
Figure 3:
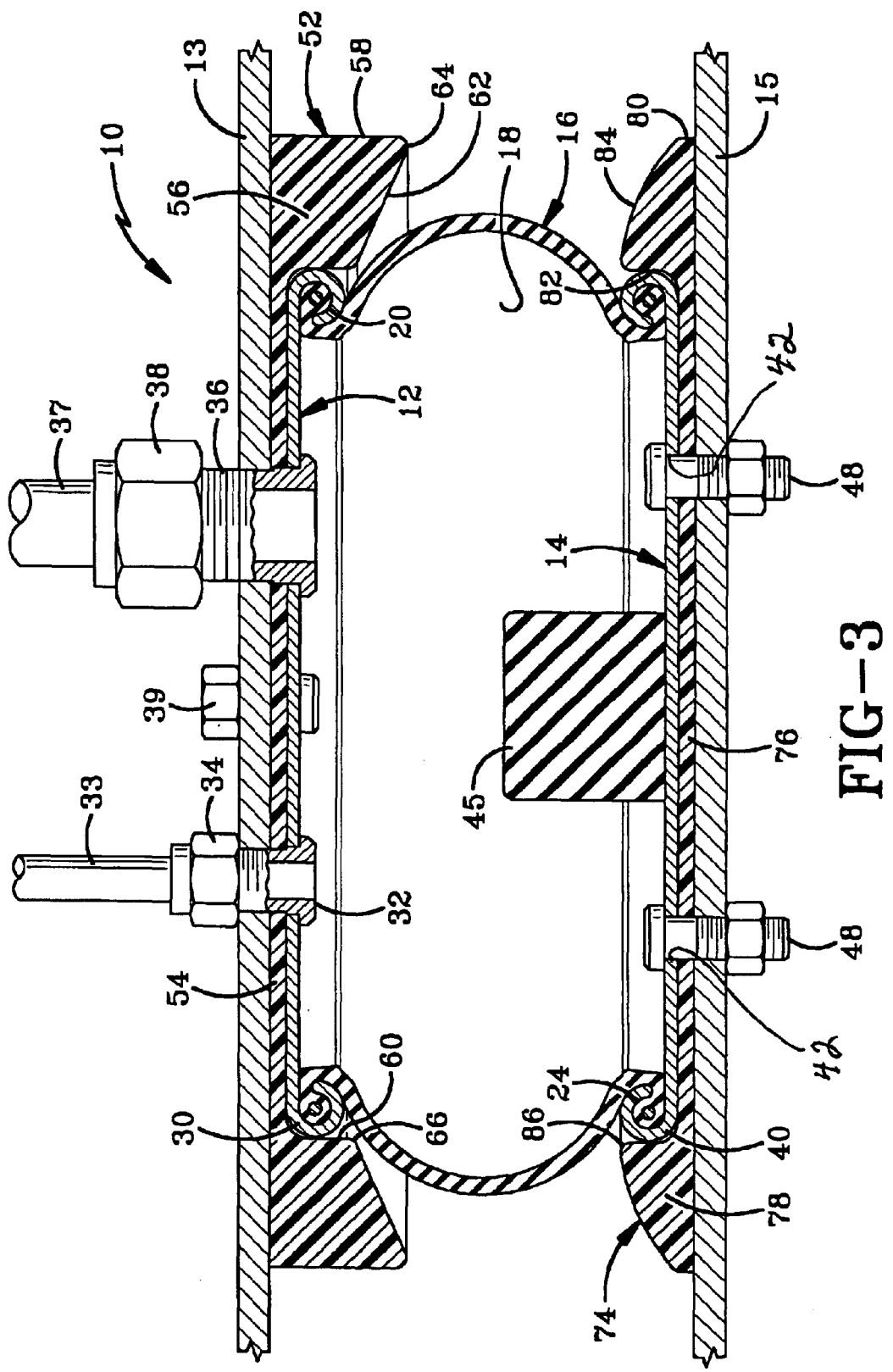
FIG. 3 is a sectional view of the air spring of FIG. 1.

A preferred embodiment of a vehicle air spring assembly according to the present invention is shown in FIGS. 1–4 and is indicated generally at 10. As best seen in FIGS. 2 and 3, air spring assembly 10 is of a convoluted air spring type which generally includes a top bead or end plate 12, a bottom bead or end plate 14 and a flexible bladder or bellows 16 extending between and connected to end plates 12 and 14. Bead plates 12 and 14 attach to two spaced members 13 and 15 respectively (FIG. 1), for providing cushioning therebetween. Members 13 and 15 may be parts of a motor vehicle, such as a vehicle chassis and vehicle axle, or any other device where cushioning is desired between two spaced members. Bladder 16 is sealingly engaged by end plates 12 and 14 to form a pressurized fluid chamber 18. Bladder 16 is preferably formed of a rubber material, which may include fabric cords embedded therein to strengthen the bladder and restrict the inflated diameter as the bladder is expanded and compressed during operation of air spring assembly 10. Bladder 16 includes an enlarged top bead 20 having an annular bead ring 22, and an enlarged bottom bead 24 having an annular bead ring 26.

Figure 4:
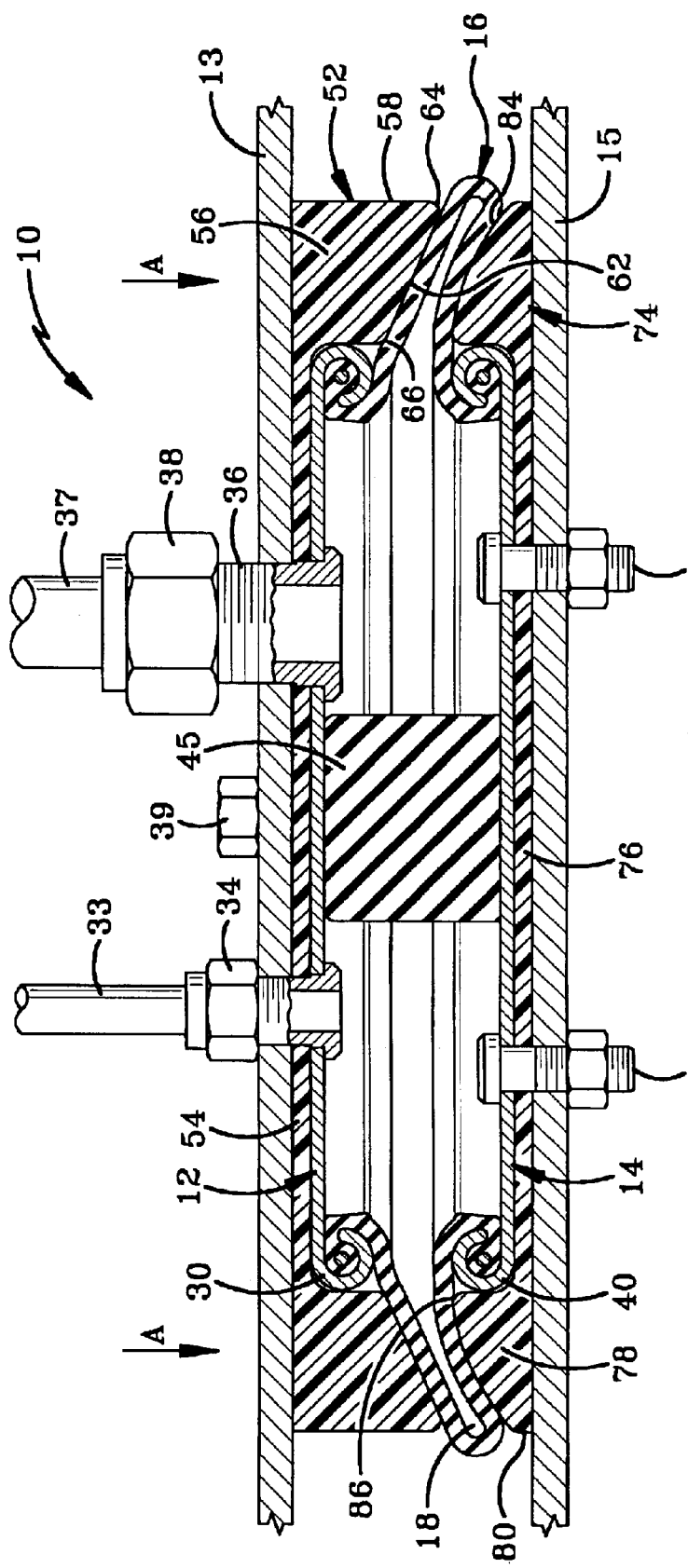
FIG. 4 is a sectional view similar to FIG. 3 showing the air spring of FIG. 1 in a compressed position.

Top end plate 12 is a generally flat disk-shaped member having an annular outer edge 30, which is crimped downwardly and inwardly around the enlarged top bead 20 (best seen in FIGS. 3 and 4). Crimped edge 30 retains and sealingly connects the bladder 16 to top end plate 12. A pair of air fittings 32 and 36 may extend through top end plate 12, or remain flush, to provide fluid communication between fluid chamber 18 and respective fluid supply lines 33 and 37 (FIGS. 3 and 4), respectively. The fluid supply lines 33 and 37 may connect to air fittings 32 and 36, respectively, with threaded nuts 34 and 38, respectively, or any other suitable connector. Fluid supply lines 33 and 37 connect chamber 18 with a compressor or other source of pressurized fluid (not shown) for inflating bladder 16. A pair of fasteners 39 (only one shown) extends upwardly from top end plate 12 and is in an offset relationship with respect to air fittings 32 and 36. Fasteners 39 may be threaded studs or any other type of fastener suitable for connecting top end plate 12 to spaced member 13.

Bottom end plate 14 is similar to top end plate 12 and includes an annular outer edge 40 (FIG. 2), which is crimped upwardly and inwardly around the enlarged bottom bead 24 of bladder 16 (best seen in FIGS. 3 and 4). Crimped edge 40 retains and sealingly connects bladder 16 to bottom end plate 14. A pair of fasteners 48 (FIGS. 3 and 4) extends downwardly from plate 14 through holes 42. Fasteners 48 may be threaded studs or any other type of fasteners suitable for connecting bottom end plate 14 to spaced member 15. Bottom end plate 14 may also contain air fittings (not shown) which communicate with chamber 18. An elastomeric bumper 45 preferably is mounted on plate 14 to engage top end plate 12 when the air spring is in a compressed position as shown in FIG. 4 to prevent pinching of bladder 16.

In accordance with the invention, a top bead skirt 52 extends over top end plate 12 and includes a recessed generally flat central portion 54 and an annular downwardly extending outer portion 56. As best seen in FIG. 2, outer annular portion 56 is formed with an axially extending flat outer side surface 58, a flat axially extending inner surface 60 and an angled generally flat bottom surface 62 which extends in an outward, generally radial direction between outer surface 58 and inner surface 60 to control the movement of bladder 16. The junction between bottom surface 62 and the outer and inner surfaces 58 and 60, respectively, is formed by smooth curved edges or corners 64 and 66, respectively. Curved edges 64 and 66 provide a smooth surface over which an upper portion of bladder 16 rolls during compression of air spring assembly 10. Top bead skirt 52 is formed with holes 68 and 70 (FIG. 2) for allowing air-fittings 32 and 36, respectively, to extend therethrough, and with holes (not shown) for allowing fasteners 39 to extend therethrough.

A bottom bead skirt 74 extends over the bottom surface of bottom end plate 14 and includes a generally flat recessed central portion 76 and an annular upwardly extending outer portion 78. As best seen in FIG. 2, annular portion 78 is formed with an outer end surface 80, an inner axially extending surface 82 and a curved bladder control top surface 84 which extends in an outward, generally radial direction between outer end surface 80 and inner surface 82. Surface 84 can be planar similar to surface 62 of skirt 52, but preferably has a slightly convex curvature as shown in FIGS. 2–4. Annular portion 78 extends outwardly beyond crimped edge 40 of bottom end plate 14 and extends upwardly to at least the top surface of crimped edge 40 as shown in FIG. 3. The junction between top surface 84 and inner surface 82 is formed with a smooth annular curved corner 86. Curved corner 86 and top surface 84 provide smooth surfaces over which the lower portion of bladder 16 rolls during compression of air spring assembly 10. Bottom bead skirt 74 is formed with holes 90 (FIG. 2) which align with holes 42 for allowing fasteners 48 to extend therethrough. The angle of bottom 62 of top bead skirt 52 is generally complementary to that of top surface 84 of bottom bead skirt 74 to provide for the desired nesting engagement therebetween to prevent pinching of the bladder between the bead skirts when the air spring is in the collapsed or compressed position as shown in FIG. 4 when top end plate 12 abuts bumper 45. This nesting can be achieved by providing surface 62 with a flat or slightly concave configuration which matches a straight or slightly convex configuration of surface 84. Bead skirts 52 and 74 may be formed of an injection or compression molded plastic, die cast aluminum, sand cast aluminum, stamped steel, or injection or transfer molded high durometer rubber, or any other suitable material which is capable of withstanding the pressure and environment to which air spring 10 will be subjected.

In one example of air spring 10 in use, fasteners 39 attached top end plate 12 to a vehicle chassis and fasteners 48 attached bottom end plate 14 to a vehicle axle. Hoses 33 and 37 are connected to a source of pressurized air, which pressurizes chamber 18 and expands bladder 16. Top bead plate 12 and bottom bead plate 14 will move toward and away from one another as air spring 10 is compressed and expanded, respectively. When air spring 10 is compressed, as indicated by arrows A of FIG. 4, bladder 16 expands radially outwardly as the bead plates move toward one another.

The expanded top portion of bladder 16 contacts top bead skirt 52 and is guided radially outwardly along angled bottom surface 62 thereof. Likewise, the expanded bottom portion of bladder 16 rolls along top surface 84 of bottom bead skirt 74 and is guided radially outwardly thereby. Curved corners 64, 66 and 86 provide smooth surfaces over which the bladder rolls and prevent damage to the outer surface of the bladder 16 as it contacts bead skirts 52 and 74. By guiding the expanded portion of the bladder radially outwardly, bead skirts 52 and 74 control the shape of the bladder as the air spring travels between its maximum extended height and its minimum collapsed height. Controlling the shape of bladder 16 changes the effective area with respect to the air spring height, which, in turn, changes the dynamic load and thus the dynamic spring rate of air spring 10.

In accordance with the invention, the generally complementary shape of annular portions 56 and 78 of bead skirts 52 and 74, and particularly the matching of surfaces 62 and 84, allow the bead skirts to nestle or nest with respect to each other and reduce pinching of the bladder 16 therebetween while providing for a closer spacing between bead plates 12 and 13. This enables a shorter height air spring to be used while achieving the same benefits achieved by a taller air spring not having the nesting feature of the skirt surfaces as provided by skirts 52 and 74 without compromising bladder 16.

Bead skirts 52 and 74 are shown as separate members positioned over the respective end plates, thus allowing a standard convoluted air spring to be retrofit with skirts 52 and 74. However, it is understood that bead skirts 52 and 74 may be formed integrally with the end plates without affecting the concept of the invention. Further, the shape of outer annular portions 56 and 78 of top bead skirt 52 and bottom bead skirt 74, respectively, and particularly the shape of surfaces 62 and 84, can be of any shape which enables the bead skirts to guide the rolling movement of bladder 16 and nest therebetween when the air spring is in the collapsed position of FIG. 4, thus controlling the dynamic load characteristics of air spring assembly 10 and prevent pinching of the bladder.

Additionally, although bead skirts 52 and 74 are shown sandwiched between the end plates and spaced members 13 and 15, respectively, the bead skirts may be snap-fit to the end plates or may be clamped around the bead plates to hold the bead skirts in place. Likewise, an adhesive or other type of fastener can be used to secure the skirts in position.

Figure 5:
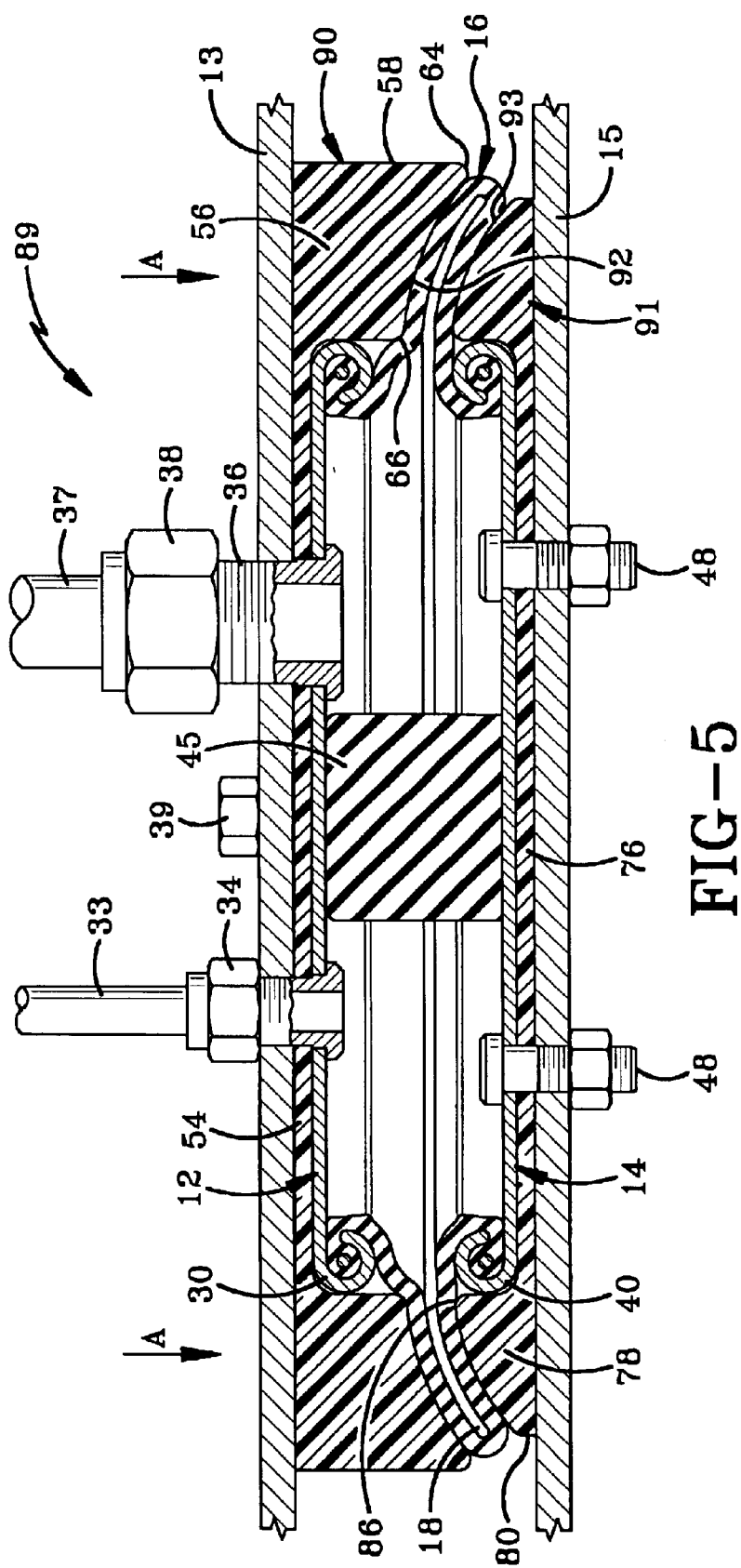
FIG. 5 is a view similar to FIG. 4 showing a modified skirt configuration to achieve nesting therebetween when in the collapsed position.

A modified air spring is shown in FIG. 5 and is indicated generally at 89. Air spring 90 includes a pair of modified skirts indicated generally at 90 and 91, which are mounted on bead plates 12 and 13, respectively. Skirts 90 and 91 are similar to skirts 52 and 74, discussed above, except that surface 92 of skirt 90 is concave and matches the convex surface 93 of skirt 91. This provides for increased nestability between the skirts when the air spring is in a collapsed position, as shown in FIG. 5, without excessively pinching the trapped bladder therebetween. Again, this nesting of surfaces 92 and 93 enables a shorter height air spring to be obtained while obtaining the same benefits in the change of the spring characteristics as that achieved with an air spring having non-nesting skirts, such as shown in U.S. Pat. No. 6,345,813. The remaining features and structures of air spring 89 shown in FIG. 5 are the same as those of air spring 10 discussed above.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An air spring assembly comprising:
   a first end plate;
   a second end plate;
   a flexible bladder extending between and sealing connected to said first and second end plates to form a pressurized air chamber;
   first and second skirts surrounding said first and second end plates, respectively, each of said skirts having an annular control surface extending outwardly therefrom and engagable with the bladder to control the shape of the bladder as the first and second end plates move towards and away from one another during operation of said air spring and along said control surfaces; wherein said control surfaces are complementary in shape to provide a general nesting relationship therebetween when the air spring assembly is in a compressed position; each of said skirts having an annular configuration with a recessed central portion with the end plates being seated in the recessed central portion of the skirts; and
   a plurality of aligned holes formed in the central portion of one of the skirts and the corresponding end plate for receiving fasteners therethrough.

2. The air spring assembly defined in claim 1 in which one of the control surfaces is planar and the other is convexly shaped.

3. The air spring assembly defined in claim 1 in which one of the control surfaces is convex and the other is concave.

4. The air spring assembly defined in claim 1 in which the annular control surfaces generally align with each other in a spaced relationship when the air spring is in a compressed position.

5. The air spring assembly defined in claim 1 in which the end plates are secured in the central portions of the skirts by a snap-fit connection.

6. The air spring assembly defined in claim 1 in which the end plates are secured in the central portions of the skirts by an adhesive.

7. The air spring assembly defined in claim 1 in which the each of the end plates have an annular outer edge which is crimped about a bead formed on an end of the bladder to provide a sealed connection there between.

8. The air spring assembly defined in claim 1 in which each of the skirts have a generally axially extending inner annular surface extending between the recessed central portion and the control surface.

9. The air spring assembly defined in claim 8 in which an annular curved corner joins the inner annular surface with the control surface.

10. The air spring assembly defined in claim 1 in which the skirts are formed of a plastic material.

11. An air spring assembly comprising:
    a first end plate;
    a second end plate;
    a flexible bladder extending between and sealing connected to said first and second end plates to form a pressurized air chamber;
    first and second skirts surrounding said first and second end plates, respectively, each of said skirts having an annular control surface extending outwardly therefrom and engagable with the bladder when the bladder moves from a static at-rest position toward a compressed position to control the shape of the bladder by guiding expanded portions of the bladder radially outwardly along and beyond said annular control surfaces, as the first and second end plates move towards one another during operation of said air spring, said control surfaces being out of contact with the bladder when the air spring is in the static at-rest position and are dissimilar to each other and complementary in shape to provide a general nesting relationship therebetween when the air spring assembly is in the compressed position.

12. The air spring assembly defined in claim 11 in which one of the control surfaces is planar and the other is convexly shaped.

13. The air spring assembly defined in claim 11 in which one of the control surfaces is convex and the other is concave.

14. The air spring assembly defined in claim 11 in which the bladder control surfaces generally align with each other in a spaced relationship when the air spring is in the compressed position.

15. The air spring assembly defined in claim 11 which each of the skirts have an annular configuration with a recessed central portion; and in which the end plates are seated in the recessed central portion of the skirts.

16. The air spring assembly defined in claim 15 in which the end plates are secured in the central portions of the skirt by a snap-fit connection.

17. The air spring assembly defined in claim 15 in which a plurality of aligned holes are formed in the central portion of one of the skirts and the corresponding end plate for receiving fasteners therethrough.

18. The air spring assembly defined in claim 11 in which the each of the end plates have an annular outer edge which is crimped about a bead formed on an end of the bladder to provide a sealed connection therebetween.

\* \* \* \* \*